No. 740,564. PATENTED OCT. 6, 1903.
J. H. HENDRICKSON.
FRICTION CLUTCH.
APPLICATION FILED AUG. 4, 1902.
NO MODEL. 2 SHEETS—SHEET 1.
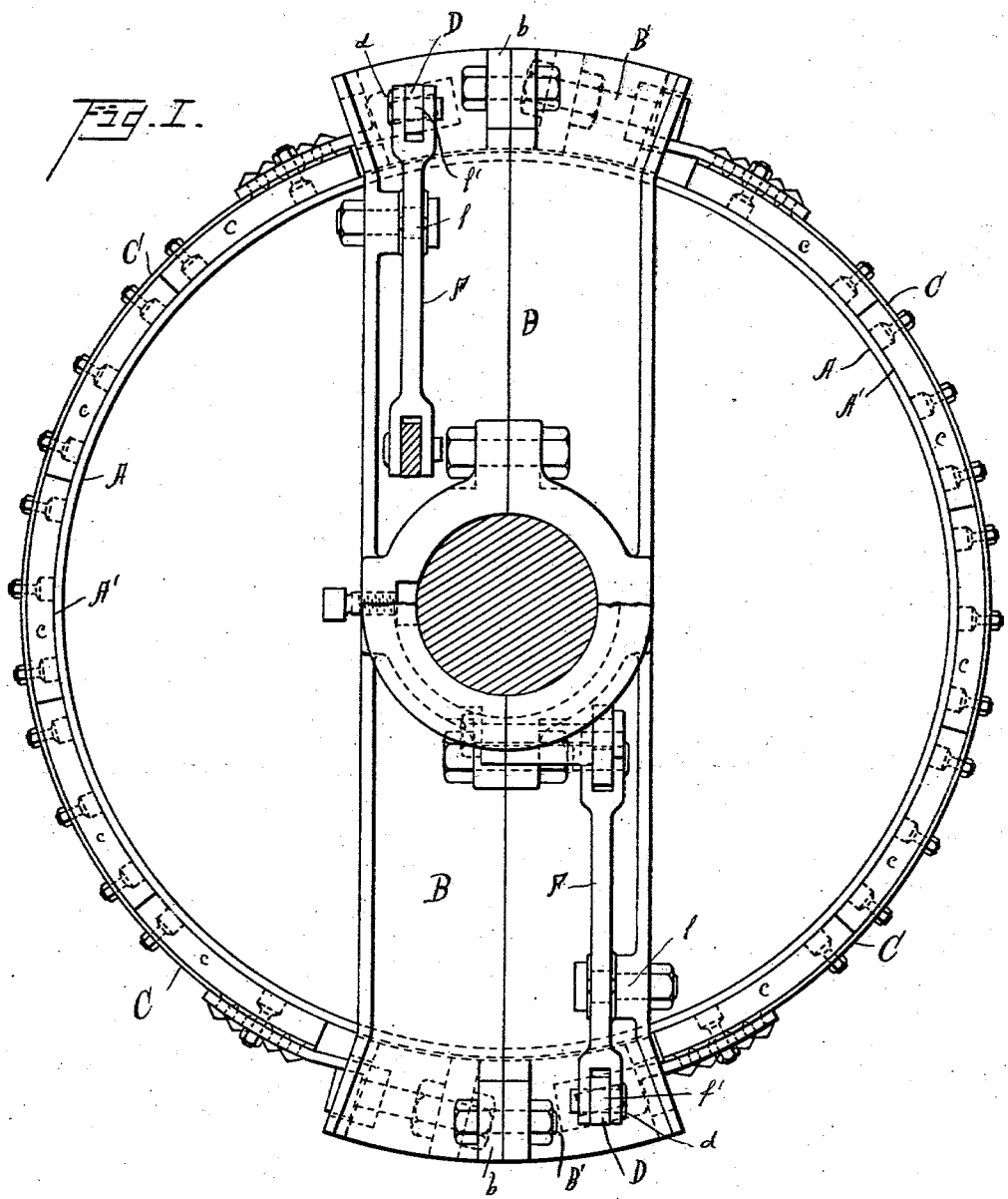
Witnesses:
A. L. Lord.
K. C. Bradley.
Inventor.
John H. Hendrickson
by W. E. Donnell
his Att'y.

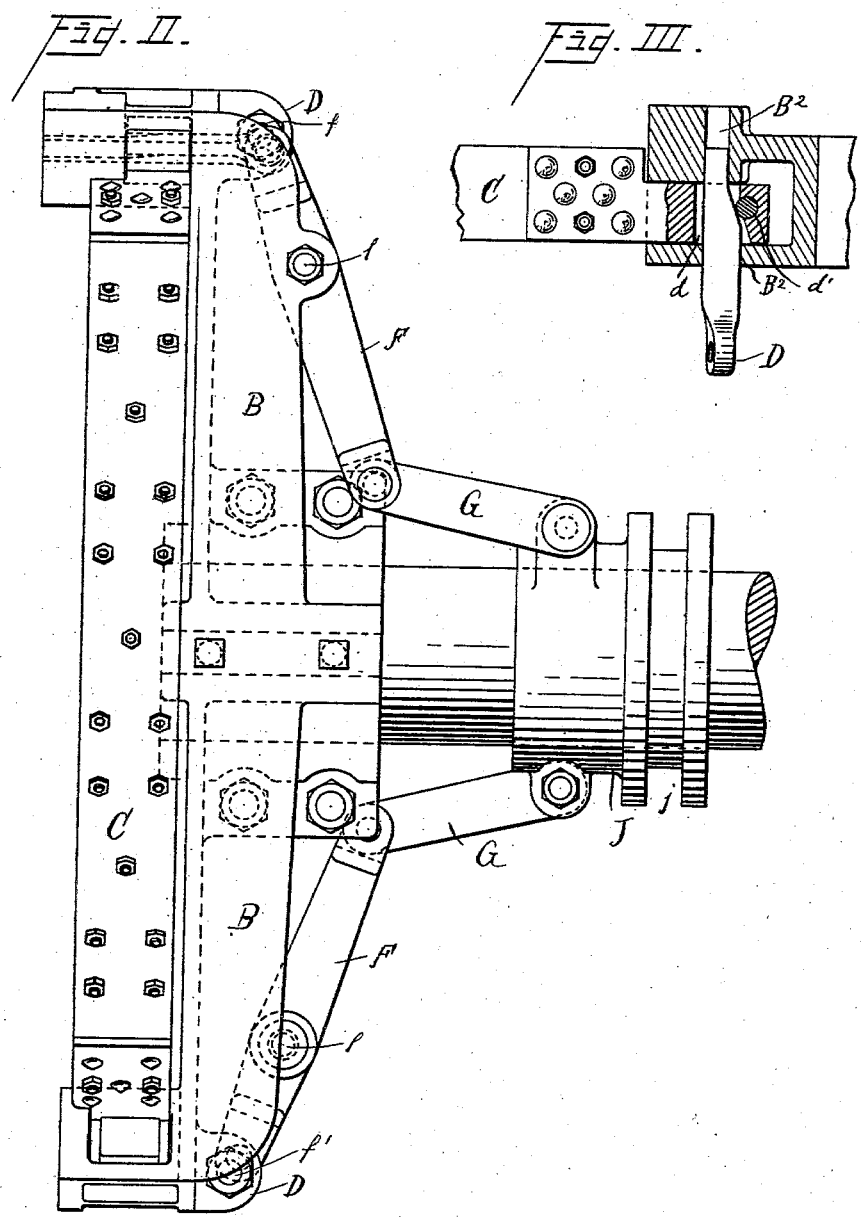

No. 740,564. Patented October 6, 1903.

UNITED STATES PATENT OFFICE.

JOHN H. HENDRICKSON, OF BAYBRIDGE, OHIO.

FRICTION-CLUTCH.

SPECIFICATION forming part of Letters Patent No. 740,564, dated October 6, 1903.

Application filed August 4, 1902. Serial No. 118,303. (No model.)

*To all whom it may concern:*

Be it known that I, JOHN H. HENDRICKSON, a citizen of the United States, residing at Baybridge, in the county of Erie and State of Ohio, have invented certain new and useful Improvements in Friction-Clutches; and I do hereby declare the following to be a full, clear, and exact description of the invention, such as will enable others skilled in the art to which it pertains to make and use the same.

My invention relates to friction-clutches, and has for its object simplicity of construction, effectiveness of operation both in engagement and disengagement, ease of manipulation, and economy in repairing.

My invention consists in engaging the outer periphery of the loose wheel or part by means of two semicircular rings operated from and secured to a spider which is keyed to the shaft.

My invention further consists in details of construction and combination of parts, all of which will be hereinafter fully set forth and claimed.

In the drawings, Figure I is a view in front elevation of a friction-clutch embodying my invention. Fig. II is a view in edge elevation or side elevation, showing the mechanism for opening and closing the clutch or engaging and disengaging the same. Fig. III is a detail view of the wedge mechanism employed for operating the semicircular clamping-rings.

A represents a wheel or pulley, which is loosely mounted on a shaft. This wheel or pulley A may be an annular horizontally-projecting ring which is secured to another pulley or drum or other mechanism adapted to be set into operation through the clutch.

B represents a spider, which is securely keyed to a revolving shaft. This spider projects approximately at right angles from the shaft in diametrically opposite directions and forms a base or support for the clamping-rings and wedges for operating the same, together with the arms for operating the aforesaid wedges.

C represents semicircular clamping-bands, which are formed of spring-steel of sufficient gage or thickness to spring away from the rim A' of the wheel A. These clamping-bands C are formed of the same curvature as the rim A' and are provided on their inner face with friction-shoes *c c c c* of suitable number, which are preferably formed in segments and secured to said semicircular pieces C by means of bolts, so that they may be replaced when they become worn. Other means may be employed for securing the shoes *c c c c* to the bands C, but preferably such means to allow of the said shoes being replaced when they become worn. At one end the bands C are adjustably secured one to one end of the spider B and the other to the other end of the spider B, the adjustment being accomplished by attaching said bands to said spider by means of lugs *b b*, formed upon the spider, and bolts B' B', which engage said lugs at the respective ends of the spider B and also engage the respective ends of the bands C. Lock-nuts may be employed and are preferably employed for the adjustment of these parts. The opposite ends of the respective bands C are constructed so as to be engaged by wedges D, (shown more clearly in Fig. III of the drawings,) and for this purpose the aforesaid ends are provided with openings or slots *d d*, through which said wedges pass, and a hardened cylindrical roller or key *d'* is provided at the one side of the said slots for the purpose of sustaining the wear caused by friction of said wedge with said parts and also for the purpose of allowing said key or wedge to enter said slots freely. The wedges D slide within openings or ways B², formed in the outer ends and to one side of the arm or spider B, and the inclination of the wedges D is such (see Fig. III) that as they are moved in one direction the bands C C are drawn so as to contact with the rim A through their friction-shoes *c c c c*, and when said wedges are moved in the opposite direction the said bands C C are released and spring outward free from the rim A'. Thus it will be seen that as the said wedges D are moved in one direction or another the semicircular bands C C are tightened to or released from said rim A', thus causing the said rim, with its attached pulley or parts, to revolve with the spider-arm B, which is attached to the shaft, or to release said bands C C and allow the said spider-arm B to revolve without causing the rim A' and its attached parts to move.

For the purpose of operating the wedges D, I provide two pivoted levers F F, which are pivotally secured to the respective ends of the spider B, as at $ff$, and also pivotally secured at their outer ends, as at $f'f'$, to the wedges B. The inner ends of the arms F F are respectively secured, by means of pivoted links G G, to a sleeve J, which slides on shaft K, and a bifurcated lever, which embraces the annular groove $j$ of the sleeve J, is employed for moving said sleeve in one direction or the other as required, thus moving the link-arms G G, levers F F, and wedges D D in or out and in turn loosening or tightening the bands C C, as hereinbefore explained.

It will be noticed that the semicircular bands, with their respective shoes $c\ c\ c\ c$, are attached at their both ends to the outer ends of the spider B, thus forming a continuous ring completely surrounding the rim A' and engaging it almost its entire periphery when the clutch is "set," and hence the pressure of the clutch is in a radial direction toward the axial center of the clutch at almost all points counteracting the centrifugal force in counterdistinction to increasing the outer pressure, as is the case in clutches of this type heretofore devised, or at least with most of them.

Still another feature of my invention is that the centrifugal force tends to release the bands C C from the rim A', thus getting quick release action and preventing accidental engagement even should some of the operating parts become broken or loosened.

In illustrating my invention and setting it forth as above I have shown certain constructive features and assemblage of parts which I consider best adapted to attain strength and simplicity and also quick action; but I do not, therefore, wish to limit my invention to these details or assemblages, inasmuch as many modifications may be employed without departing from the spirit of my invention.

What I claim is—

1. The combination with the shaft and the wheel loosely mounted thereon, of a friction-band adapted to engage the said wheel, a spider fixed upon the said shaft and having one of the ends of the said band secured thereto, and the other end thereof adjustably mounted therein, means arranged in the said spider and engaging the adjustably-mounted end of the said band for causing the same to move into and out of engagement with the said wheel, and means for operating the said means.

2. The combination with the shaft, the spider, and the pulley mounted thereupon, of a pair of semicircular friction-bands adapted to engage the periphery of the said pulley, said bands having one of their ends secured to the said spider and their opposite ends being provided with openings and being adjustably mounted in the said spider, wedges operating in the said spider and engaging the openings of the said bands and means for operating the said wedges, substantially as and for the purpose specified.

3. The combination with the shaft, and the wheel loosely mounted thereon, of a spider keyed to said shaft, friction-band having one of its ends secured to the said spider and its other end formed with a slot, and being adjustably mounted in said spider, a roller mounted in the opening of said band, a wedge mounted in said spider and being adapted to project through the opening of said band, and means for operating said wedge.

4. In combination with the wheel, and brake-band having one of its ends formed with a slot, a means for actuating said band into and out of engagement with the wheel, said means comprising a slidably-mounted member, said member being tapered and passing through the slot of said band, and means for operating said member.

Signed at Sandusky, in the county of Erie and State of Ohio, this 1st day of May, 1902.

JOHN H. HENDRICKSON.

Witnesses:
  JOHN H. IMMEL,
  M. A. WENNELL.